(12) United States Patent
Furuta

(10) Patent No.: US 10,078,012 B2
(45) Date of Patent: Sep. 18, 2018

(54) MEASUREMENT APPARATUS WITH ADJUSTMENT FOR SPECTRAL SHIFT

(71) Applicant: CANON KABUSHIKI KAISHA, Tokyo (JP)

(72) Inventor: Yasutomo Furuta, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/655,295

(22) PCT Filed: Jan. 29, 2014

(86) PCT No.: PCT/JP2014/052597
§ 371 (c)(1),
(2) Date: Jun. 24, 2015

(87) PCT Pub. No.: WO2014/129306
PCT Pub. Date: Aug. 28, 2014

(65) Prior Publication Data
US 2015/0346028 A1    Dec. 3, 2015

(30) Foreign Application Priority Data

Feb. 20, 2013 (JP) ................................. 2013-031426

(51) Int. Cl.
*G01J 3/02* (2006.01)
*G03G 15/043* (2006.01)
*G01J 3/50* (2006.01)

(52) U.S. Cl.
CPC ............. *G01J 3/0286* (2013.01); *G01J 3/502* (2013.01); *G03G 15/043* (2013.01)

(58) Field of Classification Search
CPC .. G01J 3/0286; G01J 3/502; G01J 3/02; G01J 3/04; G03G 15/043; G03G 15/326;
(Continued)

(56) References Cited

U.S. PATENT DOCUMENTS 3,711,708 A * 1/1973 Dolin .................. G01J 3/02
                                        250/343
4,986,665 A   1/1991 Yamanishi et al. .......... 356/402
(Continued)

FOREIGN PATENT DOCUMENTS

JP    S60-095545    6/1985
JP    H01-287444    11/1989
(Continued)

OTHER PUBLICATIONS

AIPN English translation of Japanese document JP-2010096731.*
(Continued)

*Primary Examiner* — Mohamed K Amara
(74) *Attorney, Agent, or Firm* — Fitzpatrick, Cella, Harper & Scinto

(57) ABSTRACT

A measurement apparatus comprises: a light emitting means for emitting a light; a light receiving means for receiving a reflected light from a measurement target, the light receiving means comprises a plurality of light-receiving elements; a detection means for detecting a temperature of the light emitting means; a determination means for determining a correspondence between each light-receiving element of the light receiving means and a wavelength of the reflected light from the measurement target based on a result of receiving the reflected light from a reference element and the temperature of the light emitting means detected by the detection means; and an output means for outputting spectral reflectance information for the measurement target based on a result of receiving the reflected light from the measurement target and the correspondence determined by the determination means.

15 Claims, 11 Drawing Sheets

(58) Field of Classification Search
CPC . G03G 15/0435; G03G 15/04072; B41J 2/45; B41J 2/473; G01N 21/274; G01N 2201/1211; G01N 21/314
See application file for complete search history.

(56) References Cited

U.S. PATENT DOCUMENTS

| | | | | |
|---|---|---|---|---|
| 5,347,475 A * | 9/1994 | Taylor | G01J 3/02 | 356/326 |
| 5,502,782 A * | 3/1996 | Smith | G02B 6/02071 | 385/1 |
| 5,751,462 A * | 5/1998 | Shiraishi | B41J 2/473 | 347/243 |
| 5,754,283 A | 5/1998 | Keane et al. | | 356/73 |
| 6,418,281 B1 * | 7/2002 | Ohki | G03G 15/5062 | 358/300 |
| 6,423,249 B1 * | 7/2002 | Leveille | G01J 1/429 | 252/584 |
| 6,431,446 B1 * | 8/2002 | Gu | G01J 3/28 | 235/454 |
| 6,485,625 B1 * | 11/2002 | Simpson | B01J 19/0093 | 204/450 |
| 6,501,585 B2 * | 12/2002 | Shiraishi | H04N 1/506 | 250/236 |
| 6,959,157 B2 * | 10/2005 | Nakayama | G03G 15/5058 | 358/461 |
| 7,116,417 B2 * | 10/2006 | Imura | G01J 3/28 | 356/318 |
| 7,705,983 B2 | 4/2010 | Imura et al. | | 356/328 |
| 8,849,080 B1 * | 9/2014 | Manzur | H01S 5/147 | 359/341.1 |
| 9,234,839 B2 * | 1/2016 | Hruska | G01N 21/359 | |
| 9,366,631 B2 * | 6/2016 | Tan | B01L 3/502753 | |
| 9,513,170 B2 * | 12/2016 | Kita | G01J 3/501 | |
| 9,546,904 B2 * | 1/2017 | Pawluczyk | G01J 3/027 | |
| 9,888,152 B2 * | 2/2018 | Itagaki | H04N 1/6044 | |
| 2003/0016363 A1 * | 1/2003 | Sandstrom | G01J 1/4257 | 356/519 |
| 2005/0068520 A1 | 3/2005 | Beimers et al. | | 356/72 |
| 2006/0158649 A1 * | 7/2006 | Iffland | G01J 3/28 | 356/369 |
| 2006/0221341 A1 | 10/2006 | Paul et al. | | 356/406 |
| 2008/0118181 A1 * | 5/2008 | Potuluri | G01J 3/02 | 382/275 |
| 2008/0297791 A1 | 12/2008 | Imura | | |
| 2009/0015829 A1 * | 1/2009 | Rezac | G01J 3/28 | 356/301 |
| 2009/0127431 A1 | 5/2009 | Helbing et al. | | 250/205 |
| 2009/0167013 A1 | 7/2009 | Horikoshi | | 283/81 |
| 2010/0202055 A1 * | 8/2010 | Norton | G01J 3/02 | 359/568 |
| 2011/0019192 A1 | 1/2011 | Imura | | 356/421 |
| 2011/0299104 A1 * | 12/2011 | Seo | G01J 3/02 | 358/1.9 |
| 2012/0105882 A1 | 5/2012 | Horita | | 358/1.9 |
| 2013/0038867 A1 * | 2/2013 | Ebihara | G01J 3/502 | 356/300 |

FOREIGN PATENT DOCUMENTS

| | | |
|---|---|---|
| JP | 2000-505887 | 5/2000 |
| JP | 2001-352455 A | 12/2001 |
| JP | 2002-243635 A | 8/2002 |
| JP | 2004-086013 A | 3/2004 |
| JP | 2005-017210 | 1/2005 |
| JP | 2007-144954 | 6/2007 |
| JP | 2008-185565 | 8/2008 |
| JP | 2010-0096731 A | 4/2010 |
| JP | 2010-210456 A | 9/2010 |
| JP | 2012-098152 A | 5/2012 |

OTHER PUBLICATIONS

Chinese Official Action dated Jul. 12, 2016, in counterpart Chinese Patent Application No. 2014-80009066.5, and partial English translation thereof.

* cited by examiner

FIG. 4

Header:

size: 270176 bytes
CMMType: 'appl'
version: 0x02002001
profileClose: 'prtr'
dataColorSpace: 'CMYK'
InterchangeSpace: 'XYZ'
CreationDate: 3.4.1996, 19:46:14
CS23Signature:'acsp' prim.platform: 'APPL'
flags: 0x00000000
deviceManufacture: 'EF1'
deviceModel: 0
deviceAttributes: 0x00000000, 0x00000000
renderingIntent: 2
white XYZ: X=0.9642, Y=1.0000, Z=0.8249

Tag Table: <1D elements, double-click to inspect>

| Ind | Signet. | elementoffset | size |
|---|---|---|---|
| 0 | 'A2B0' | 252=0x000000FC | 43002 |
| 1 | 'B2A0' | 43255=0x0000A8F8 | 42940 |
| 2 | 'A2B1' | 86196=0x0015084 | 43002 |
| 3 | 'B2A1' | 129200=0x001F880 | 42940 |
| 4 | 'A2B2' | 172140=0x002A06C | 43002 |
| 5 | 'B2A2' | 215144=0x0034888 | 42940 |
| 6 | 'gamt' | 258084=0x003F024 | 11925 |
| 7 | 'desc' | 270012=0x0041E8C | 125 |
| 8 | 'cprt' | 270140=0x0041F3C | 14 |
| 9 | 'wtpt' | 270156=0x0041F4C | 20 |

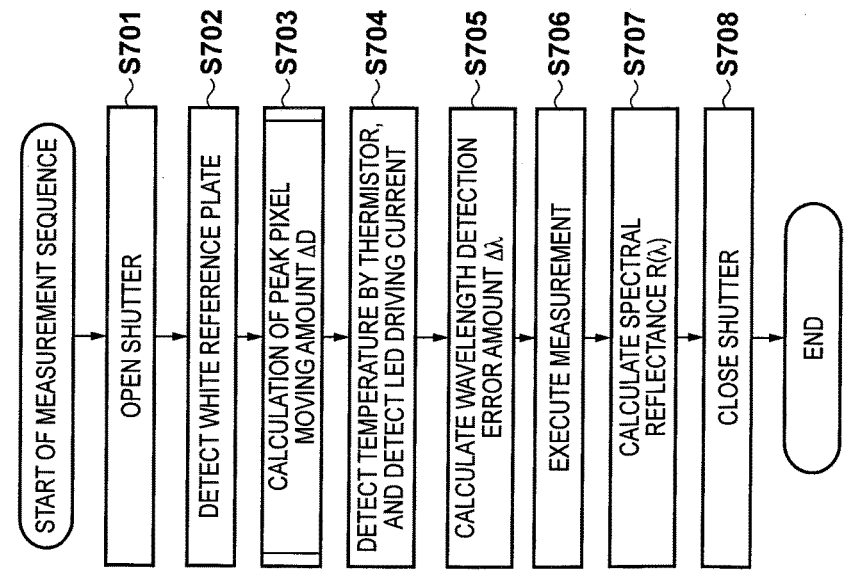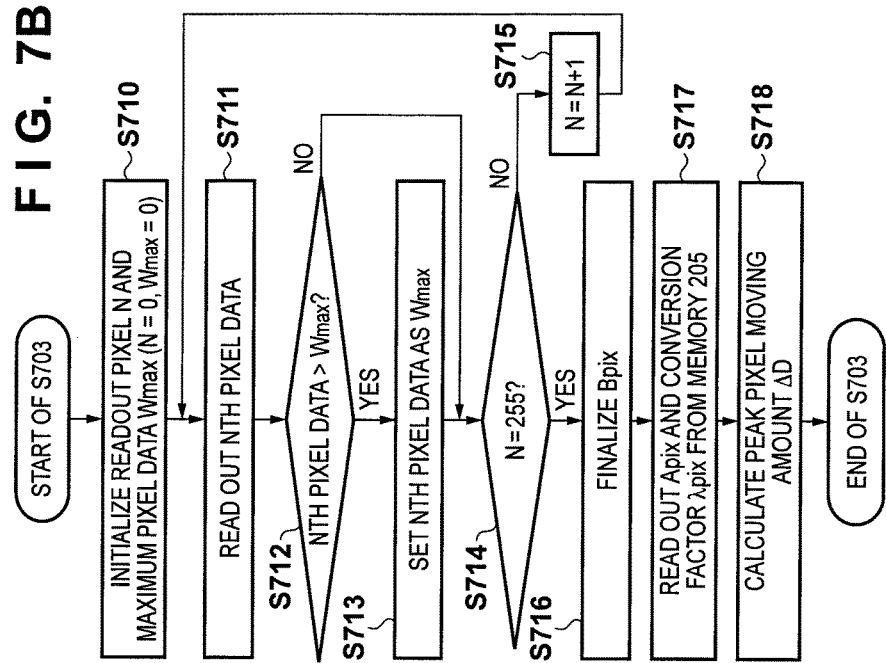

FIG. 9

| LED ELEMENT TEMPERATURE FLUCTUATION AMOUNT ΔT' | WAVELENGTH DETECTION ERROR AMOUNT Δλ |
|---|---|
| -10 | Δλ(-10) |
| -9 | Δλ(-9) |
| -8 | Δλ(-8) |
| -7 | Δλ(-7) |
| -6 | Δλ(-6) |
| -5 | Δλ(-5) |
| -4 | Δλ(-4) |
| -3 | Δλ(-3) |
| -2 | Δλ(-2) |
| -1 | Δλ(-1) |
| 0 | Δλ(0) |
| 1 | Δλ(+1) |
| 2 | Δλ(+2) |
| 3 | Δλ(+3) |
| 4 | Δλ(+4) |
| 5 | Δλ(+5) |
| 6 | Δλ(+6) |
| 7 | Δλ(+7) |
| 8 | Δλ(+8) |
| 9 | Δλ(+9) |
| 10 | Δλ(+10) |

MEASUREMENT APPARATUS WITH ADJUSTMENT FOR SPECTRAL SHIFT

TECHNICAL FIELD

The present invention relates to a measurement apparatus having a function of measuring a color.

BACKGROUND ART

The quality of an image (to be referred to as an image quality hereinafter) by a recently popular image forming apparatus (to be referred to as a printer hereinafter) is determined by various factors such as graininess, in-plane uniformity, character quality, and color reproducibility (including color stability). A most important factor of them is color reproducibility.

As for color reproducibility, the color difference matters not only between devices of the same model, but also between devices of different models, between image forming apparatuses of different methods, and between an image forming apparatus and an image display apparatus. To perform color matching between such devices, software and a measurement device for generating a multidimensional LUT (Look Up Table) called an ICC (International Color Consortium) profile are commercially available.

As shown in FIG. 5, the contents of each ICC profile are calibrated in association with a device-independent color space based on color measurement of a measurement image (patch) using the measurement device. An example of the color space is a CIE L*a*b* color space (CIE stands for Commission International de l'Eclairage). By this processing, colors to be printed can match each other even between different devices. A CMM (Color Management Module) installed in an image forming apparatus or the like can generate print data by performing color conversion using these profiles.

Japanese Patent Laid-Open No. 2004-86013 proposes an inline measurement device arrangement in which a patch image formed on a sheet is detected by a color sensor constructed by a light source, diffraction grating, and position detection sensor, thereby increasing the detection accuracy. A detection value from the color sensor is converted into a spectral reflectance, and the spectral reflectance can be converted into a CIE Lab value in consideration of the tristimulus values and the like. The color detection accuracy of the color sensor in Japanese Patent Laid-Open No. 2004-86013 degrades owing to fluctuation factors such as output fluctuations of the light source upon a change of the environmental temperature. To solve this, there is a method of performing calibration using a white reference plate arranged at a position facing the color sensor, and correcting the detection value of the color sensor. As the calibration method, light reflected by the white reference plate is measured before or after executing color measurement of a patch image, and then calculation is performed based on the measurement value. Letting $W(\lambda)$ be the quantity of light reflected by the white reference plate and $P(\lambda)$ be the quantity of light reflected by the patch, a spectral reflectance calculation method in calculation using the white reference plate is given by:

$$\text{spectral reflectance } R(\lambda) \text{ of patch} = \frac{P(\lambda)}{W(\lambda)} \quad (1)$$

The white reference plate reflects light of a measurement wavelength region at almost the same reflectance regardless of the wavelength. Thus, the quantity $W(\lambda)$ of light reflected by the white reference plate can be considered to be equal to the quantity of light incident on the patch image. By measuring both the quantity (that is, $W(\lambda)$) of light incident on the patch image and the reflected light quantity $P(\lambda)$, the spectral reflectance $R(\lambda)$ of the patch can be calculated without the influence of output fluctuations of the light source.

The color sensor includes a line sensor in which a plurality of light-receiving elements are arrayed. The positional relationship between each element of the line sensor and each light wavelength may deviate owing to variations in part assembly or the like, and a color wavelength component may be erroneously detected in measurement. This phenomenon will be called a wavelength detection error. To prevent the wavelength detection error, for example, the relationship between each element of the line sensor and the wavelength of incident light may be adjusted by adjustment processing in the factory.

However, in the color sensor, a holding member which holds each part thermally expands upon a temperature change. Then, the positional relationship between parts deviates and the tint (L*a*b* value) to be detected changes, resulting in a measurement error. Letting $\Delta\lambda$ be the wavelength detection error amount, the quantity $W(\lambda)$ of light reflected by the white reference plate, the quantity $P(\lambda)$ of light reflected by the patch, and the spectral reflectance $R(\lambda)$ have a relationship given by:

$$\text{spectral reflectance } R(\lambda) = \frac{P(\lambda - \Delta\lambda)}{W(\lambda - \Delta\lambda)} \quad (2)$$

As a method of obtaining $\Delta\lambda$, a method of obtaining the peak pixel moving amount detected by the line sensor is conceivable. In initial adjustment, a light-receiving pixel of the line sensor from which a highest peak output was obtained is stored based on the detection value of the line sensor. By detecting the moving amount of the peak output upon a temperature change, the wavelength shift amount can be detected. In this manner, a wavelength shift arising from the sensor can be corrected by detecting the wavelength detection error amount $\Delta\lambda$ and solving equation (2).

However, the method of calculating the wavelength detection error amount $\Delta\lambda$ by peak detection has the following problem. If a wavelength fluctuation of the light source and a wavelength detection error on the sensor side co-occur upon a temperature change, the wavelength shift amount of the light source varied with temperature of the light source and the wavelength detection error amount $\Delta\lambda$ on the line sensor side coexist in the peak pixel moving amount detected by the line sensor. For this reason, only the wavelength detection error amount $\Delta\lambda$ cannot be obtained. Since the wavelength detection error amount $\Delta\lambda$ cannot be detected accurately, it cannot be corrected accurately, generating a measurement error.

SUMMARY OF INVENTION

According to one aspect of the present invention, there is provided a measurement apparatus characterized by comprising: a light emitting means for emitting a light; a light receiving means for receiving a reflected light from a measurement target, the light receiving means comprises a plurality of light-receiving elements; a temperature detection means for detecting a temperature of the light emitting means; a determination means for determining a correspondence between each light-receiving element of the light receiving means and a wavelength of the reflected light from the measurement target based on a result of receiving, by the light receiving means, the reflected light from a reference element and the temperature of the light emitting means detected by the temperature detection means; and an output means for outputting spectral reflectance information for the measurement target based on a result of receiving, by the light receiving means, the reflected light from the measurement target and the correspondence determined by the determination means.

According to the present invention, an error by wavelength fluctuations of a light source caused by a temperature change can be corrected, increasing the measurement accuracy of a sensor.

Further features of the present invention will become apparent from the following description of exemplary embodiments (with reference to the attached drawings).

BRIEF DESCRIPTION OF DRAWINGS

FIG. 4 is a view for explaining an ICC profile;

FIGS. 7A and 7B are flowcharts according to the first embodiment;

FIG. 9 is a table showing a correction table according to the second embodiment;

DESCRIPTION OF EMBODIMENTS

<First Embodiment>

The first embodiment according to the present invention will be described in detail with reference to the accompanying drawings.

(Image Forming Apparatus)

The first embodiment will be explained using an electrophotographic laser beam printer. Although the following description is based on the electrophotographic method, the present invention is also applicable to an image forming apparatus which fixes an image by a thermal drying method, such as an inkjet printer or sublimation printer. The structure and operation of the image forming apparatus according to the present invention will be described.

Figure 1:
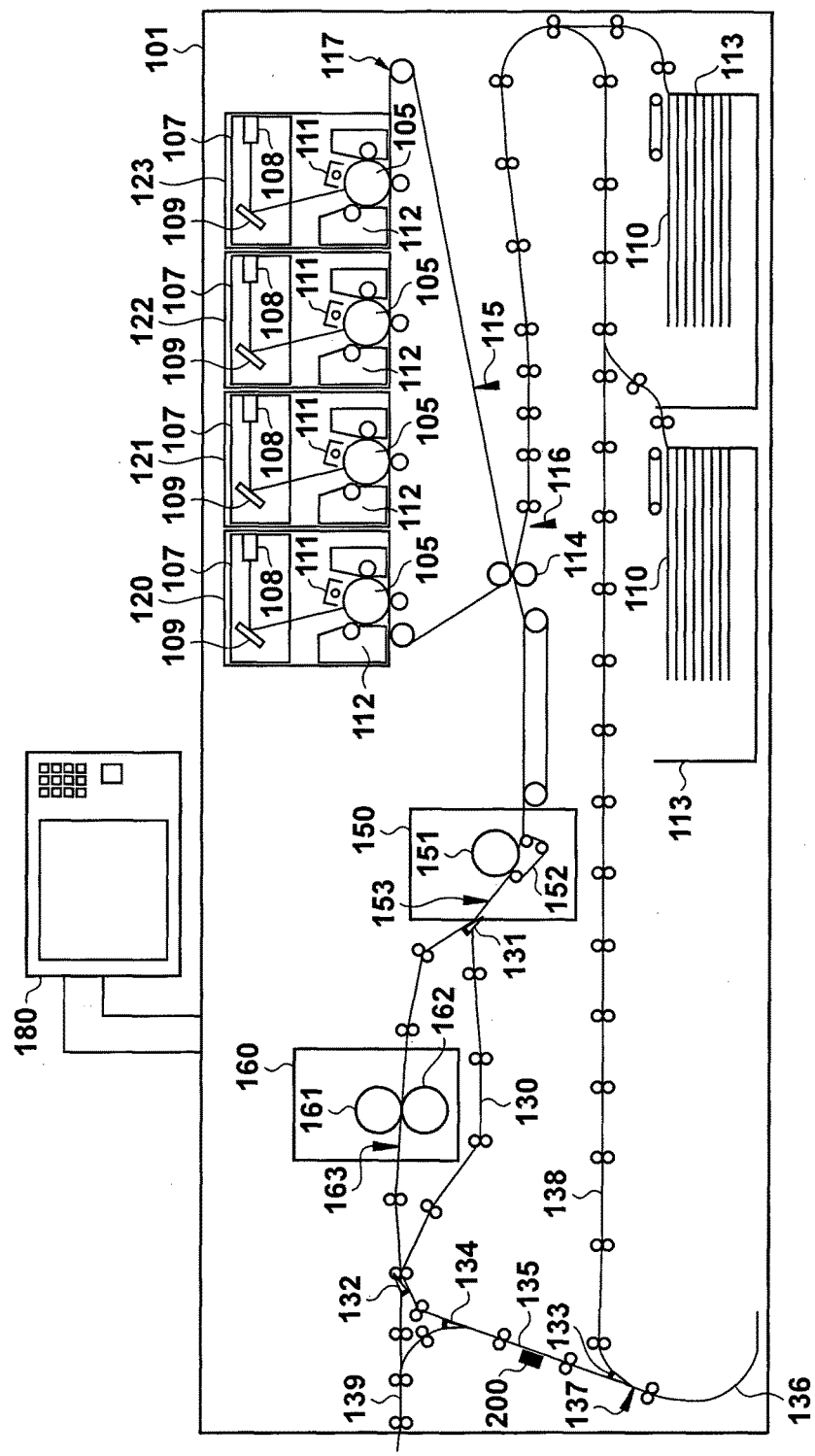
FIG. 1 is a sectional view showing an example of the arrangement of an image forming apparatus.

FIG. 1 is a sectional view showing the structure of an image forming apparatus (to be referred to as a printer hereinafter) 100 in the embodiment. The printer 100 includes a housing 101. The housing 101 incorporates respective mechanisms for constructing an engine unit, and a control board storage unit (not shown) which stores an engine control unit 312 for performing control concerning respective print processes (for example, sheet feed processing) by the respective mechanisms and a printer controller 103.

As the mechanisms for constructing the engine unit, an optical processing mechanism, fixing processing mechanism, sheet feed processing mechanism, conveyance processing mechanism, and the like are arranged. The optical processing mechanism performs formation of electrostatic latent images on photosensitive drums 105 by scanning of laser beams, visualization of the electrostatic latent images, multiple transfer of the visual images to an intermediate transfer member 106, transfer of the multiple-transferred color image to a sheet 110, and the like. The fixing processing mechanism fixes a toner image transferred to the sheet 110. The sheet feed processing mechanism performs sheet feed processing of the sheet 110. The conveyance processing mechanism performs conveyance processing of the sheet 110.

The optical processing mechanism includes a laser driver in each laser scanner unit 107 to perform ON/OFF driving of a laser beam emitted by a semiconductor laser (not shown) in accordance with image data supplied from the printer controller 103. The laser beam emitted by the semiconductor laser is oscillated in the scanning direction by a rotating polygon mirror. The laser beam oscillated in the main scanning direction is guided to the photosensitive drum 105 via a reflecting mirror 109 to expose the surface of the photosensitive drum 105 in the main scanning direction.

An electrostatic latent image which is charged by a primary charger 111 and formed on the photosensitive drum 105 by scan exposure with a laser beam is visualized into a toner image with toner supplied from a developing unit 112. The toner image visualized on the photosensitive drum 105 is transferred onto the intermediate transfer member 106 to which a voltage opposite in characteristic to the toner image is applied (primary transfer). In color image formation, images of respective colors are sequentially formed onto the intermediate transfer member 106 from a Y (Yellow) station 120, M (Magenta) station 121, C (Cyan) station 122, and K (blacK) station 123. As a result, a full-color visual image is formed on the intermediate transfer member 106.

Then, the sheet 110 fed from a storage 113 is conveyed. Simultaneously when transfer rollers 114 press the sheet 110 against the intermediate transfer member 106, a bias opposite in characteristic to the toner is applied to the transfer rollers 114. The visual image formed on the intermediate transfer member 106 is then transferred onto the sheet 110 which is synchronously fed in the sub-scanning direction by the sheet feed processing mechanism (secondary transfer). Note that the photosensitive drum 105 and developing unit 112 are detachable.

An image formation start position detection sensor 115, sheet feed timing sensor 116, and density sensor 117 are arranged around the intermediate transfer member 106. The image formation start position detection sensor 115 determines a printing start position when performing image formation. The sheet feed timing sensor 116 adjusts the sheet feed timing of the sheet 110. The density sensor 117 measures the density of a measurement image (patch) in density control. When density control is performed, the density sensor 117 measures the density of each patch.

The fixing processing mechanism includes a first fixing unit 150 and second fixing unit 160 for fixing a toner image transferred to the sheet 110 by heat and pressure. The first fixing unit 150 includes a fixing roller 151 for applying heat to the sheet 110, a pressure belt 152 for pressing the sheet 110 against the fixing roller 151, and a post-fixing sensor 153 for detecting the completion of fixing. The fixing roller 151 is hollow, incorporates a heater (not shown), and is configured to convey the sheet 110 simultaneously when the fixing roller 151 is driven to rotate. The second fixing unit 160 is positioned downstream of the first fixing unit 150 in the conveyance path of the sheet 110. The second fixing unit 160 is arranged to add gloss to a toner image on the sheet 110 that has been fixed by the first fixing unit 150, and ensure fixation. Similar to the first fixing unit 150, the second fixing unit 160 also includes a fixing roller 161, pressure roller 162, and post-fixing sensor 163.

Depending on the type of sheet 110, the sheet 110 need not pass through the second fixing unit 160. To reduce the energy consumption in this case, a conveyance path 130 is arranged to discharge the sheet 110 without passing through the second fixing unit 160. A conveyance path switching flapper 131 can guide the sheet 110 to the conveyance path 130.

A conveyance path switching flapper 132 guides the sheet 110 to a conveyance path 135. After a reversing sensor 137 detects the position of the sheet 110, a reversing unit 136 performs a switchback operation to swap over the leading end of the sheet 110.

A color sensor 200 configured to detect a patch image on the sheet 110 is further arranged downstream of the second fixing unit 160 in the conveyance direction. An instruction about a color detection operation is issued in accordance with an instruction from an operation unit 180. Based on the detection result, the engine control unit 312 executes density adjustment, tone adjustment, and multicolor adjustment.

(Color Sensor)

Figure 2A:
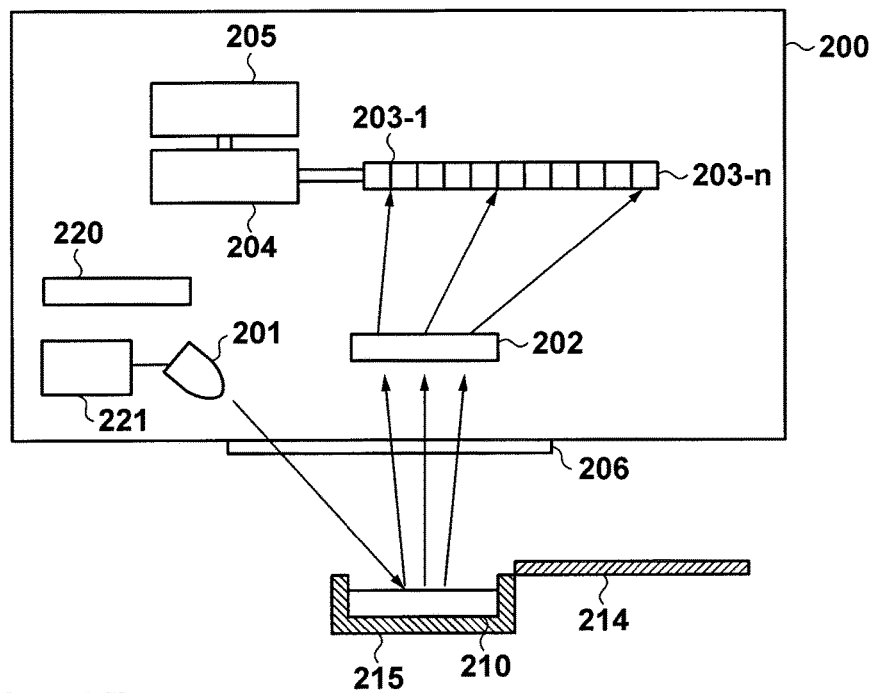
FIGS. 2A and 2B are views showing the arrangement of a color sensor.
Figure 2B:
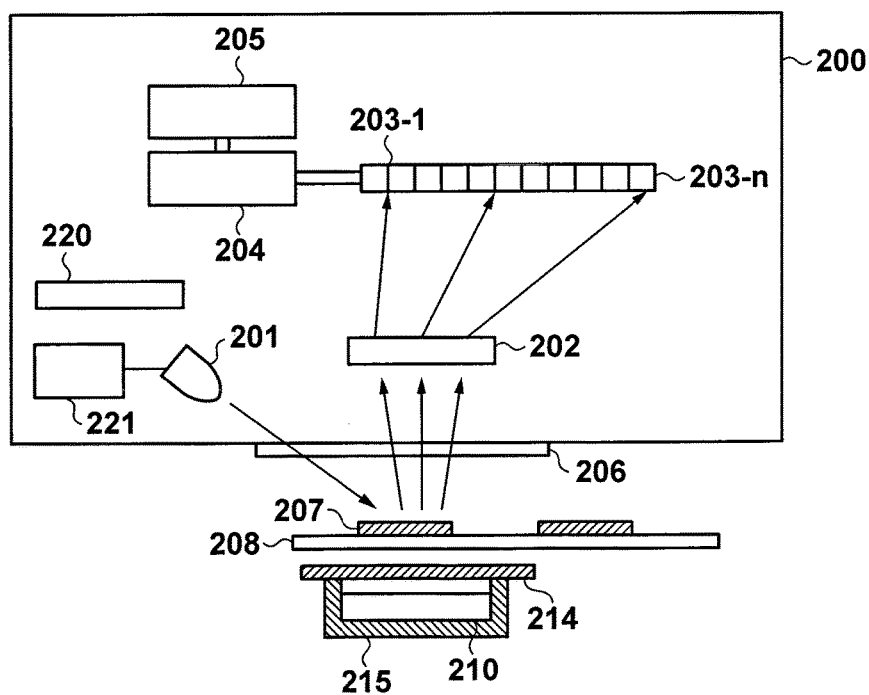

The structure and measurement operation of the color sensor 200 will be explained. FIGS. 2A and 2B are views showing the structure of the color sensor 200 in the embodiment. The color sensor 200 incorporates an LED light source 201, a diffraction grating 202, line sensors 203, that is, 203-1 to 203-$n$, a calculation unit 204, and a memory 205. The LED light source 201 irradiates, with white light, each toner patch (to be referred to as a patch hereinafter) 207 on a sheet 208. The diffraction grating 202 separates, for respective wavelengths, light which has been reflected by the patch 207 and passed through a window 206. The line sensors 203, that is, 203-1 to 203-$n$ are constructed by n pixels each serving as a light-receiving element configured to detect light decomposed for respective wavelengths by the diffraction grating 202. The calculation unit 204 performs spectral calculation from the light intensity values of the respective pixels that are detected by the line sensors 203. The memory 205 saves various data.

The calculation unit 204 includes, for example, a spectral calculation unit (not shown) which performs spectral calculation based on a light intensity value, and a Lab calculation unit (not shown) which calculates a Lab value. The arrangement of the color sensor 200 may incorporate a lens which converges light emitted by the LED light source 201 to the patch 207 on the sheet 208 and converges light reflected by the patch 207 to the diffraction grating 202. In the embodiment, light reflected by the white reference plate 210 is detected to perform calibration of the color sensor 200, details of which will be described later.

[Basic Operation]

Next, an arrangement in which the result of detection by the color sensor 200 is fed back in the printer 100 will be described.

(Description of Basic Sequence of Adjustment)

A basic sequence to generate a profile and output an image by using the profile in the printer 100 according to the embodiment will be explained. In the embodiment, an ICC (International Color Consortium) profile is used as a profile for implementing high color reproducibility. However, the present invention is not limited to this. For example, CRD (Color Rendering Dictionary) employed from level 2 of PostScript proposed by Adobe, a color separation table in Photoshop®, a CMYK simulation in ColorWise available from EFI to maintain black print information, or the like is also usable.

(Measurement of Spectral Reflectance and Calculation of Color Value)

As shown in FIG. 1, the printer 100 according to the embodiment includes the color sensor 200 serving as a reading means on the upstream side of a post-fixing discharge tray (not shown) in the conveyance direction. The printer 100 can measure a spectral reflectance by using the color sensor 200. The printer 100 converts the measurement result into a color value, and generates a color conversion profile by itself. The printer 100 performs internal conversion color processing by using the generated color conversion profile.

A color value calculation equation will be explained. A signal input by measuring a color by the color sensor 200 is detected on a CMOS sensor (line sensor 203) arranged in each wavelength region of 380 nm to 720 nm after light emitted by the LED light source 201 is reflected by a measurement target object and the reflected light is separated by the diffraction grating 202. The spectral reflectance is measured for the input signal. In the present invention, the spectral reflectance is converted into L*a*b* values via color matching functions or the like, as defined by CIE, in order to improve the detection calculation accuracy.

The relationship between patch information converted into L*a*b* values and the signal value of the patch is obtained, generating an ICC profile serving as a color conversion profile.

(L*a*b* Calculation)

The following is a method (step) of calculating color values (L*, a*, and b*) from the spectral reflectance. This method is defined by ISO13655.

a. The spectral reflectance $R(\lambda)$ of a sample is obtained (380 nm to 780 nm).

b. Color matching functions $x(\lambda)$, $y(\lambda)$, and $z(\lambda)$ and a standard light spectral distribution $SD50(\lambda)$ are prepared. Note that the color matching functions are defined by JIS 28701. $SD50(\lambda)$ is defined by JIS 28720 and is also called a supplementary standard illuminant D50.

c. Wavelengths are obtained using the prepared functions:

$R(\lambda) \times SD50(\lambda) \times x(\lambda)$ $R(\lambda) \times SD50(\lambda) \times y(\lambda)$ $R(\lambda) \times SD50(\lambda) \times z(\lambda)$ d. Integration of the respective wavelengths is performed:

$\Sigma\{R(\lambda) \times SD50(\lambda) \times x(\lambda)\}$ $\Sigma\{R(\lambda) \times SD50(\lambda) \times y(\lambda)\}$ $\Sigma\{R(\lambda) \times SD50(\lambda) \times z(\lambda)\}$ e. The product of the color matching function $y(\lambda)$ and standard light spectral distribution $SD50(\lambda)$ is integrated with respect to the respective wavelengths:

$\Sigma\{SD50(\lambda) \times y(\lambda)\}$ f. X, Y, and Z are calculated by:

$$X = 100 \times \frac{\Sigma\{SD50(\lambda) \times y(\lambda)\}}{\Sigma\{R(\lambda) \times SD50(\lambda) \times x(\lambda)\}}$$

$$Y = 100 \times \frac{\Sigma\{SD50(\lambda) \times y(\lambda)\}}{\Sigma\{R(\lambda) \times SD50(\lambda) \times y(\lambda)\}}$$

$$Z = 100 \times \frac{\Sigma\{SD50(\lambda) \times y(\lambda)\}}{\Sigma\{R(\lambda) \times SD50(\lambda) \times z(\lambda)\}}$$

g. L*a*b* values are calculated. For $Y/Y_n > 0.008856$, L*a*b* values are calculated by:

$$L^* = 116 \times \left(\frac{Y}{Yn}\right)^{\frac{1}{3}} - 16$$

$$a^* = 500 \times \left\{\left(\frac{X}{Xn}\right)^{\frac{1}{3}} - \left(\frac{Y}{Yn}\right)^{\frac{1}{3}}\right\}$$

$$b^* = 200 \times \left\{\left(\frac{Y}{Yn}\right)^{\frac{1}{3}} - \left(\frac{Z}{Zn}\right)^{\frac{1}{3}}\right\}$$

where $X_n$, $Y_n$, and $Z_n$ are the tristimulus values of standard light:

$$\left(\frac{X}{Xn}\right)^{\frac{1}{3}} = 7.78 \times \left(\frac{X}{Xn}\right)^{\frac{1}{3}} + \frac{16}{116}$$

$$\left(\frac{Y}{Yn}\right)^{\frac{1}{3}} = 7.78 \times \left(\frac{Y}{Yn}\right)^{\frac{1}{3}} + \frac{16}{116}$$

$$\left(\frac{Z}{Zn}\right)^{\frac{1}{3}} = 7.78 \times \left(\frac{Z}{Zn}\right)^{\frac{1}{3}} + \frac{16}{116}$$

Note that $x(\lambda)$, $y(\lambda)$, and $z(\lambda)$ are also described as $x(\bar{\lambda})$, $y(\bar{\lambda})$, and $z(\bar{\lambda})$, respectively.

(Profile Generation Processing)

In part replacement by a customer engineer, before a job requiring color matching accuracy, or when the user wants to know the tint of a final output material at the design planning stage or the like, the user operates the operation unit 180 to perform color profile generation processing.

Figure 3:
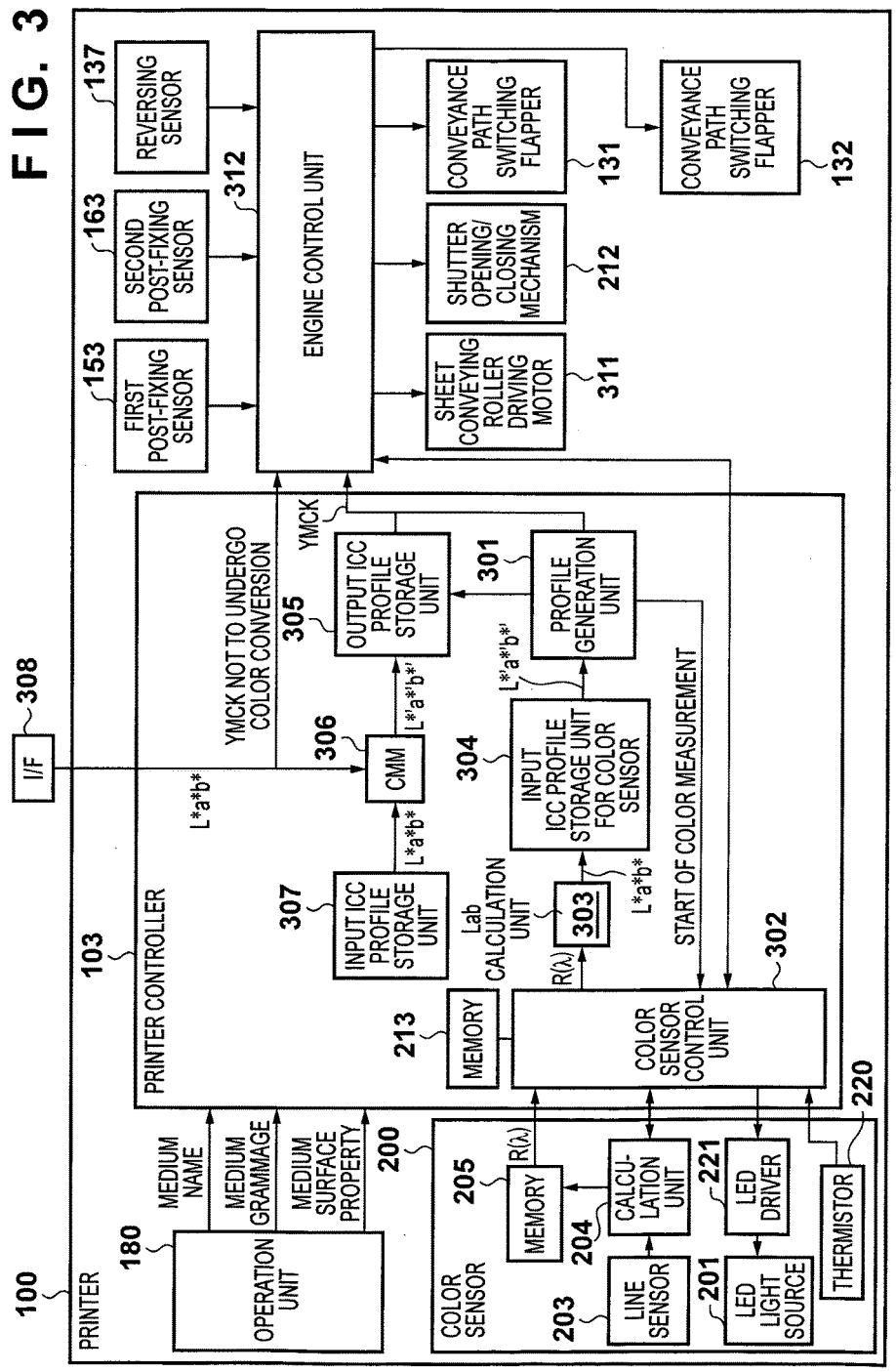
FIG. 3 is a control block diagram.

The profile generation processing is performed in the printer controller 103 shown in the control block diagram of FIG. 3. First, a profile generation instruction is input to a profile generation unit 301 via the operation unit 180. The profile generation unit 301 sends a signal to a printer unit (engine control unit 312) to output a CMYK color chart of the ISO12642 test form without the mediacy of a profile. At the same time, the profile generation unit 301 sends a measurement instruction to a color sensor control unit 302. In the printer 100, the ISO12642 test form is transferred and fixed to the sheet 110 by processes such as charging, exposure, development, transfer, and fixing, and the color sensor 200 measures the color. Spectral reflectance data of the measured patch is input to the printer controller 103, and converted into L*a*b* data by a Lab calculation unit 303. The L*a*b* data are converted in accordance with a profile stored in an input ICC profile storage unit 304 for the color sensor, and are input to the profile generation unit 301.

Note that the conversion format is not limited to L*a*b*, and spectral reflectance data may be converted into a device-independent color space signal in the CIE1931XYZ colorimetric system.

The profile generation unit 301 generates an output ICC profile based on the relationship between the output CMYK signals and the input L*a*b* data, and replaces, with it, an output ICC profile stored in an output ICC profile storage unit 305.

The ISO12642 test form includes CMYK color signal patches which cover a color reproduction gamut outputtable by a general copying machine. A color conversion table is generated from the relationship between the respective color signal values and the measured L*a*b* values. That is, a CMYK→Lab conversion table (A2B×tag) is generated. Based on the conversion table, an inverse conversion table (B2A×tag) is generated.

The ICC profile has a structure as shown in FIG. 4, and is made up of a header, tags, and their data. In addition to the color conversion table, the tags describe even a tag (gamt) representing whether a given color expressed by a white point (Wtpt) or a Lab value defined in the profile falls inside or outside the reproducible range of the hard copy.

When a profile generation instruction is accepted from an external connection device (PC or the like) via an external I/F 308, a generated output ICC profile may be uploaded to the external device so that the user can perform color conversion by an application corresponding to the ICC profile.

(Color Conversion Processing)

In color conversion for a normal color output, an image signal input on the premise of RGB signal values input via the external I/F 308 such as a scanner unit, or standard printing CMYK signal values such as Japan Color values are sent to an input ICC profile storage unit 307 for an external input. The input ICC profile storage unit 307 performs RGB→L*a*b* conversion or CMYK→L*a*b* conversion in accordance with the image signal input from the external I/F 308. The input ICC profile is constructed by a one-dimensional LUT which controls the gamma of an input signal, a multicolor LUT called direct mapping, and a one-dimensional LUT which controls the gamma of generated conversion data. The input image signal is converted from a device-dependent color space into device-independent L*a*b* data by using these tables.

The image signals converted into values in the L*a*b* color space coordinate system are input to a CMM (Color Management Module) 306. The image signals undergo gamut conversion, color conversion, black character determination, and the like. In gamut conversion, a mismatch in the output color reproduction range between the reading color space of the external I/F 308 such as a scanner unit serving as an input device, and the printer 100 serving as an output device is mapped. In color conversion, a mismatch (also called a color temperature setting mismatch) between a light source type in input and a light source type in observing an output material is adjusted. Accordingly, L*a*b* data are converted into L*'a*'b*' data, which are input to the output ICC profile storage unit 305. As described above, the generated profile is stored in the output ICC profile storage unit 305. Color conversion is performed based on the newly generated ICC profile to convert the L*'a*'b*' data into CMYK signals dependent on an output device. The CMYK signals are then output.

Figure 5:
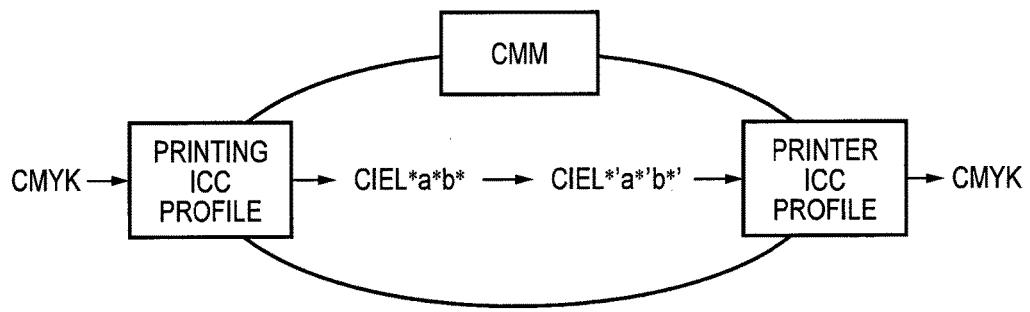
FIG. 5 is a schematic view showing a color management environment.

In FIG. 3, the CMM 306 is described separately for the input ICC profile storage unit 307 and output ICC profile storage unit 305 in terms of the block arrangement. However, the CMM 306 is a module which performs color management, as shown in FIG. 5, and is assumed to perform color conversion by using an input profile and output profile.

(Calibration Method of Color Sensor 200)

FIGS. 2A and 2B show an arrangement for performing calibration in the color sensor 200. The calibration described here is an operation of irradiating the white reference plate 210 with light from the LED light source 201, detecting the reflected light by the line sensor 203 to obtain the quantity W(λ) of light reflected by the white reference plate 210, and calculating a spectral reflectance by solving equation (1) described above. If output light (light quantity) from the LED light source 201 fluctuates, the quantity W(λ) of light reflected by the white reference plate 210 and the patch measurement value P(λ) change at the same ratio. Hence, by measuring W(λ) and P(λ) to calculate the spectral reflectance R(λ), an error generated by fluctuations can be canceled even if output light from the LED light source 201 fluctuates.

A white reference plate holding member 215 holds the white reference plate 210 used for calibration. The white reference plate holding member 215 is abutted against a sheet metal (not shown) so that the relative distance to the color sensor 200 is kept constant. The white reference plate 210 is desired to highly resist light, in order to suppress aged deterioration, and be mechanically strong. To achieve this, for example, a white reference plate obtained by performing ceramic processing for aluminum oxide is used. Further, to enhance light resistance and contamination resistance, a shutter 214 protects the white reference plate 210 at the timing not to execute calibration. The shutter 214 is assumed to perform an opening/closing operation by a driving unit (not shown) and be closed when no calibration is executed.

FIG. 2A shows the positional relationship between the white reference plate 210 and the shutter 214 when the shutter 214 is open in calibration. FIG. 2B shows a state in which the shutter 214 is closed when measuring the patch 207. In the state in which the shutter 214 is closed, the white reference plate 210 is completely shielded from light.

(Method of Correcting Wavelength Detection Error Δλ)

In the embodiment, the correspondence between each pixel of the line sensor 203 and the wavelength is determined based on a change of the temperature of the color sensor 200. First, a peak pixel is detected from the quantity W(λ) of light reflected by the white reference plate 210 that has been detected by the aforementioned white color calibration operation. In detection of the peak pixel, the output values of the respective pixels of the line sensor 203 are compared to detect a pixel having a largest value as a peak pixel. The peak pixel as the detection result, and a peak pixel in the initial state that has been stored in the memory 205 in factory adjustment are compared. From the difference, the moving amount (ΔD) of the measurement position of the peak pixel upon a temperature change is calculated.

Figure 6A:
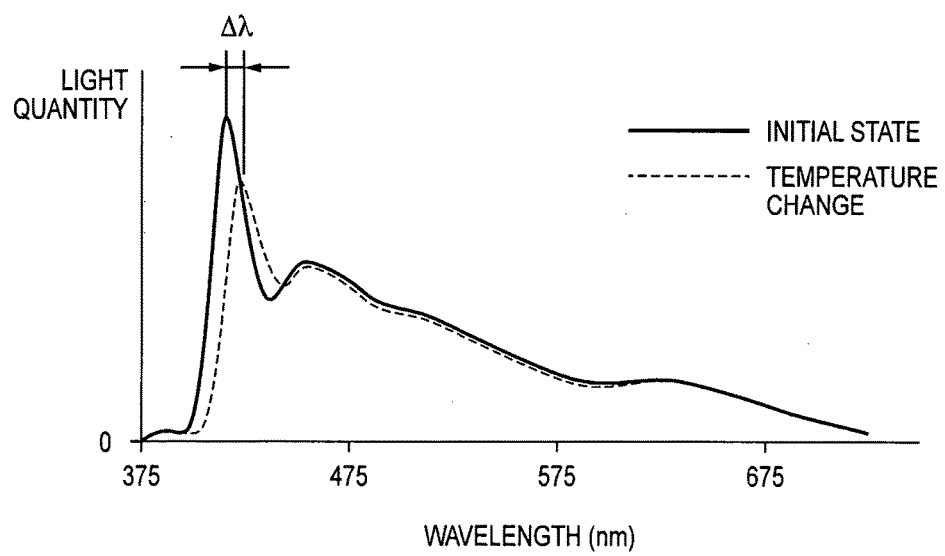
FIGS. 6A and 6B are graphs each showing the state of an LED light source and a sensor detection value upon a temperature change.
Figure 6B:
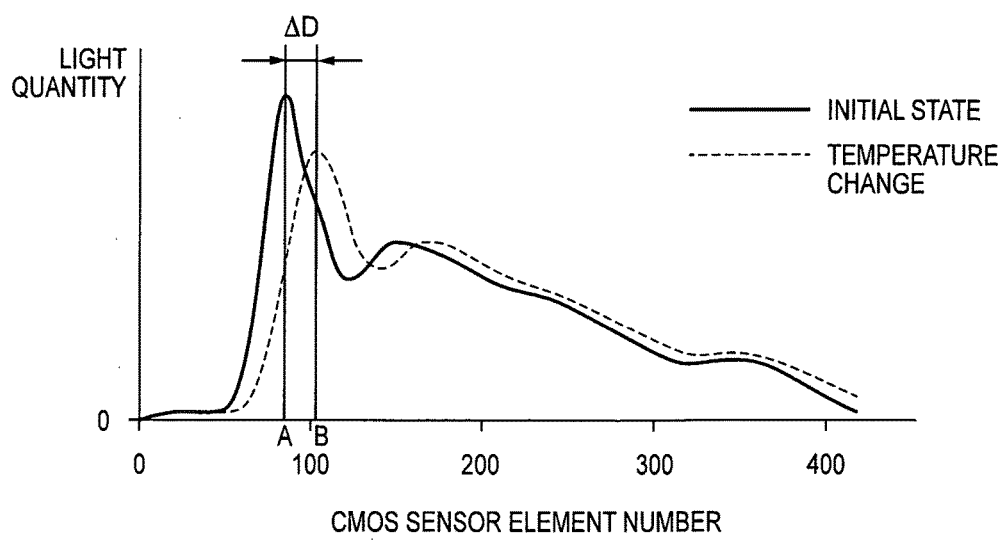

FIG. 6B shows an example of the initial state and a change of the peak pixel upon a temperature change. In FIG. 6B, the ordinate represents the light quantity detected by the pixel of the line sensor, and the abscissa represents each pixel. The peak pixel changes from a peak pixel A in the initial state to a pixel B upon a temperature change. ΔD shown in FIG. 6B indicates the moving amount of the peak pixel. The peak pixel moving amount ΔD contains two components: a wavelength detection error amount Δλ generated by shift of the positional relationship between the line sensor 203 and the wavelength, and the wavelength shift amount of an LED light source varied with temperature of the LED light source. FIG. 6A shows the wavelength detection error amount Δλ. In FIG. 6A, the ordinate represents the light quantity measured by the pixel of the line sensor, and the abscissa represents the wavelength. The wavelength detection error amount Δλ is calculated by subtracting an wavelength shift amount of the LED light source from a wavelength shift amount obtained from the peak pixel moving amount ΔD and the interval between wavelengths assigned to the respective pixels of the line sensor, as represented by:

wavelength detection error amount Δλ=(peak pixel moving amount ΔD×assigned wavelength interval between pixels of line sensor)−wavelength shift amount of LED light source    (3)

The interval between wavelengths assigned to the respective pixels of the line sensor will be explained. For example, when wavelengths are respectively assigned to n (255 in the embodiment) pixels included in the line sensor in order to detect a wavelength band of 380 nm to 720 nm, the interval between the assigned wavelengths is about 1.34 (=(720−380)/255) nm. The shift amount between a reference peak wavelength and a detected peak wavelength is obtained from the product of the peak pixel moving amount ΔD and the wavelength interval.

Figure 8:
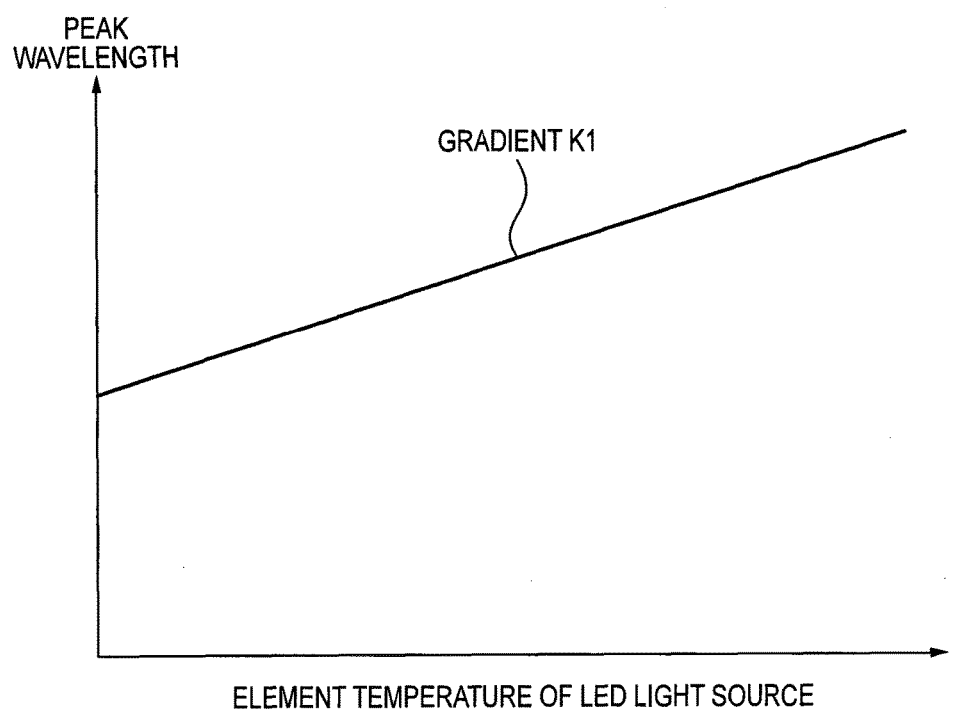
FIG. 8 is a graph showing the wavelength characteristic of the LED light source.

Next, a wavelength shift amount of an LED light source varied with temperature of the LED light source calculation method will be described. The wavelength shift amount of the LED light source varied with temperature of the LED light source changes almost linearly depending on the temperature of the LED light source 201, as shown in FIG. 8. Here, K1 is the gradient of the wavelength shift amount of LED light source 201 with respect to the temperature. K1 is measured in advance by experiment. The temperature of the LED light source 201 is obtained by adding the amount of self-heat generation of the LED light source 201 to an ambient temperature T of the LED light source 201. The ambient temperature T of the LED light source 201 is detected by a thermistor 220 arranged near the LED light source 201. The amount of self-heat generation of the LED light source 201 is calculated from a driving current I of the LED light source 201. In general, the amount of self-heat generation of the LED light source 201 is almost proportional to the power consumption and driving current. It is therefore desirable that the driving current I or power of the LED light source 201 is almost constant during the period of measurement by the line sensor 203. This can increase the accuracy when calculating the amount of self-heat generation.

In the embodiment, the amount of self-heat generation is calculated from a current value set in an LED driver 221 of the LED light source 201 according to:

temperature $T'$ of LED light source=ambient temperature $T$+driving current $I \times K2$    (4)

where the coefficient K2 is the proportionality constant regarding the driving current of the LED light source 201 and the temperature. Based on equation (4), the temperature of the LED light source is obtained.

The difference between the detected temperature T' of the LED light source and an temperature $T'_{in}$ of the LED light source in factory adjustment (initial state) is obtained to calculate an temperature fluctuation amount ΔT' of the LED light source. The wavelength shift amount of the LED light source 201 is calculated based on the temperature fluctuation amount ΔT' of the LED light source and the gradient K1 of the wavelength shift amount with respect to the temperature of LED light source 201 by using:

wavelength shift amount of LED light source=$K1 \times$ temperature fluctuation amount $\Delta T'$ of LED light source    (5)

By the above-described method, the wavelength detection error amount Δλ is obtained using equations (3) to (5). The wavelength detection error amount $\Delta\lambda$ is then canceled by solving equation (2) using P($\lambda$) obtained by measurement, W($\lambda$) obtained by measuring the white reference plate 210, and the wavelength detection error amount $\Delta\lambda$.

(Processing Sequence)

The engine control unit 312 and color sensor control unit 302 control the series of operations described above.

FIG. 7A shows an outline of the measurement operation. When the measurement operation starts, the engine control unit 312 instructs a shutter opening/closing mechanism 212 to open the shutter 214 in step S701. In step S702, the engine control unit 312 instructs the color sensor control unit 302 to detect the white reference plate 210. In detection of the white reference plate, the color sensor control unit 302 controls the LED light source 201 to emit light. At this time, the color sensor control unit 302 sets a current value in the LED driver 221 which controls the driving current value of the LED light source 201 so that the output value of the line sensor 203 becomes a predetermined value. Then, the color sensor control unit 302 obtains the quantity W($\lambda$) of light reflected by the white reference plate 210.

In step S703, the color sensor control unit 302 calculates the peak pixel moving amount $\Delta D$ by using the obtained reflected light quantity W($\lambda$). Note that the $\Delta D$ calculation sequence in this step will be explained in detail with reference to FIG. 7B. In step S704, the color sensor control unit 302 obtains the current value set in the LED driver 221 as the LED driving current value I. The color sensor control unit 302 obtains the ambient temperature T via the thermistor 220 in the color sensor 200. In step S705, the color sensor control unit 302 calculates the wavelength detection error amount $\Delta\lambda$ by solving the above-mentioned equations (3) to (5). In step S706, the engine control unit 312 operates a sheet conveying roller driving motor 311 to convey a measurement target (chart). The color sensor control unit 302 detects the measurement value P($\lambda$) of each patch. In step S707, the color sensor control unit 302 calculates the spectral reflectance R($\lambda$) by using equation (2) based on the obtained W($\lambda$), P($\lambda$), and $\Delta\lambda$. In step S708, the engine control unit 312 instructs the shutter opening/closing mechanism 212 to close the shutter 214. After that, the measurement sequence ends.

FIG. 7B shows the operation sequence of the color sensor control unit 302 when calculating the peak pixel moving amount $\Delta D$ in step S703 described above. The embodiment assumes that a line sensor including 255 pixels is used as the line sensor 203. In this step, the color sensor control unit 302 sequentially compares pixel data of the respective pixels in the line sensor 203, and obtains a pixel number $B_{pix}$ of a pixel (peak pixel) in which a maximum value $W_{max}$ of pixel data among the respective pixels has been obtained. Further, the color sensor control unit 302 calculates the peak pixel moving amount $\Delta D$ from the difference between the obtained pixel number $B_{pix}$ and a pixel number $A_{pix}$ of an initial peak pixel. This pixel data is data corresponding to a light detection amount in each pixel of the line sensor 203.

In step S710, the color sensor control unit 302 sets a readout pixel number N and the maximum pixel data $W_{max}$ to be an initial value of 0. In step S711, the color sensor control unit 302 reads out pixel data of the Nth pixel number from the line sensor 203. In step S712, the color sensor control unit 302 compares the Nth pixel data with $W_{max}$. If the data value of the Nth pixel number is larger than $W_{max}$ (YES in step S712), the color sensor control unit 302 sets the Nth pixel as the peak pixel $W_{max}$ and holds the pixel number and the data value of the peak in the memory 205 in step S713. If the data value of the Nth pixel is equal to or smaller than $W_{max}$ (NO in step S712), the color sensor control unit 302 shifts to step S714 without rewriting the $W_{max}$ value.

In step S714, the color sensor control unit 302 determines whether the current pixel number is N=255. If N≠255 (NO in step S714), the color sensor control unit 302 increments N by one in step S715, and then shifts to step S711 to repeat the processing for an unprocessed pixel. If N=255 (YES in step S714), the color sensor control unit 302 finalizes in step S716 the $W_{max}$ output value and pixel number $B_{pix}$ which have been held in the memory 205. In step S717, the color sensor control unit 302 reads out, from the memory 205, the initial peak pixel number $A_{pix}$, and a conversion factor $\lambda_{pix}$ between the inter-pixel distance and the wavelength. In step S718, the color sensor control unit 302 calculates the peak pixel moving amount $\Delta D$ by equation (6) using $B_{pix}$ finalized in step S716:

$$\text{peak pixel moving amount } \Delta D = \lambda_{pix} \times (B_{pix} - A_{pix}) \qquad (6)$$

Note that the conversion factor $\lambda_{pix}$ between the inter-pixel distance and the wavelength is a value determined by the positional relationship between an optical part such as the diffraction grating 202 and the line sensor 203, and is assumed to be held in advance in the memory 205.

Accordingly, even if the positional relationship between the wavelength of light incident on the line sensor 203 and the light-receiving element of the line sensor fluctuates upon a temperature change, the deviation amount generated by the fluctuation can be corrected, and the color measurement accuracy can be maintained against a temperature change.

Note that the embodiment has described a method of performing current control of the LED light source 201 based on light reflected by the white reference plate 210 and adjusting the light quantity to a constant value. However, the present invention is not limited to this, and the current may be set so that the driving current of the LED light source always becomes constant without performing current control. In this case, equation (4) is solved using a driving current of a fixed value. When the driving current is controlled to be constant, a temperature change caused by a self-temperature rise becomes constant and thus temperature fluctuations of the chip surface can be reduced. Note that when the driving current is constant, the light quantity cannot be adjusted by controlling the driving current in response to a decrease in light quantity by the temperature change and aged deterioration of the LED light source. Therefore, the use of an LED light source suffering a great decrease in light quantity has a disadvantage in which the quantity of light incident on the line sensor decreases and thus the S/N ratio decreases.

The embodiment has described a method of calculating the temperature of the LED light source based on the thermistor and the LED driving current detection result. However, the method of detecting the temperature of the LED light source is not limited to this. For example, there is a method of detecting a voltage across the LED light source. In general, as the temperature rises, the voltage across the LED light source drops. When an LED light source in which the relationship between the voltage across the LED light source and the temperature linearly changes is used, a means for detecting a voltage across the LED light source may be arranged instead of the thermistor and current detection means. In this case, the temperature fluctuation amount $\Delta T$' of the LED light source is calculated by detecting a fluctuation amount from the initial state.

Figure 11:
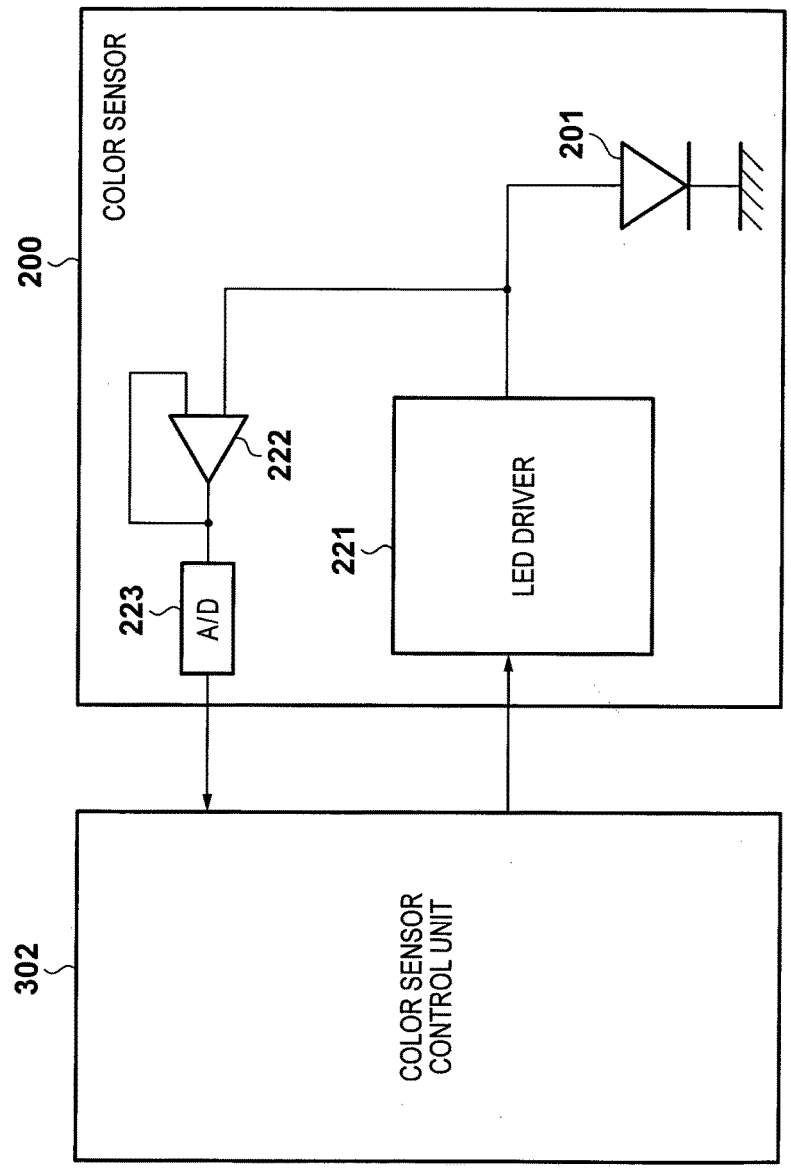
FIG. 11 is a block diagram showing a voltage detection circuit across an LED light source.

FIG. 11 shows a detection circuit for a voltage across the LED light source 201 when the voltage detection means is arranged. The color sensor control unit 302 sets the driving current of the LED light source 201 for the LED driver 221. The cathode terminal voltage of the LED light source 201 is converged into digital data by an A/D converter 223 via a voltage follower 222. The digital data is input to the color sensor control unit 302. The color sensor control unit 302 sets the driving current of the LED light source 201, then turns on the LED light source 201, and reads a voltage across the LED light source 201 after the lapse of a predetermined time. Based on the read voltage value across the LED light source 201, the chip surface temperature is calculated using a predetermined voltage-temperature conversion table.

<Second Embodiment>

As another embodiment of the present invention, the second embodiment adopts a method in which the table of a wavelength detection error amount Δλ with respect to a temperature change is employed to perform correction upon a wavelength detection error. A difference from the first embodiment will be explained in detail.

FIG. 9 shows the table of the wavelength detection error amount Δλ with respect to a temperature change. As the value of each wavelength detection error amount Δλ in the table, a typical value obtained in advance by experiment is assumed to be stored in a memory 205. In the second embodiment, an temperature fluctuation amount ΔT' of an LED light source is detected by the same operation as that in the first embodiment. A wavelength detection error amount Δλ corresponding to the obtained LED temperature fluctuation amount ΔT' is read out from the table, and the correction operation is performed.

[Processing Sequence]

Figure 10:
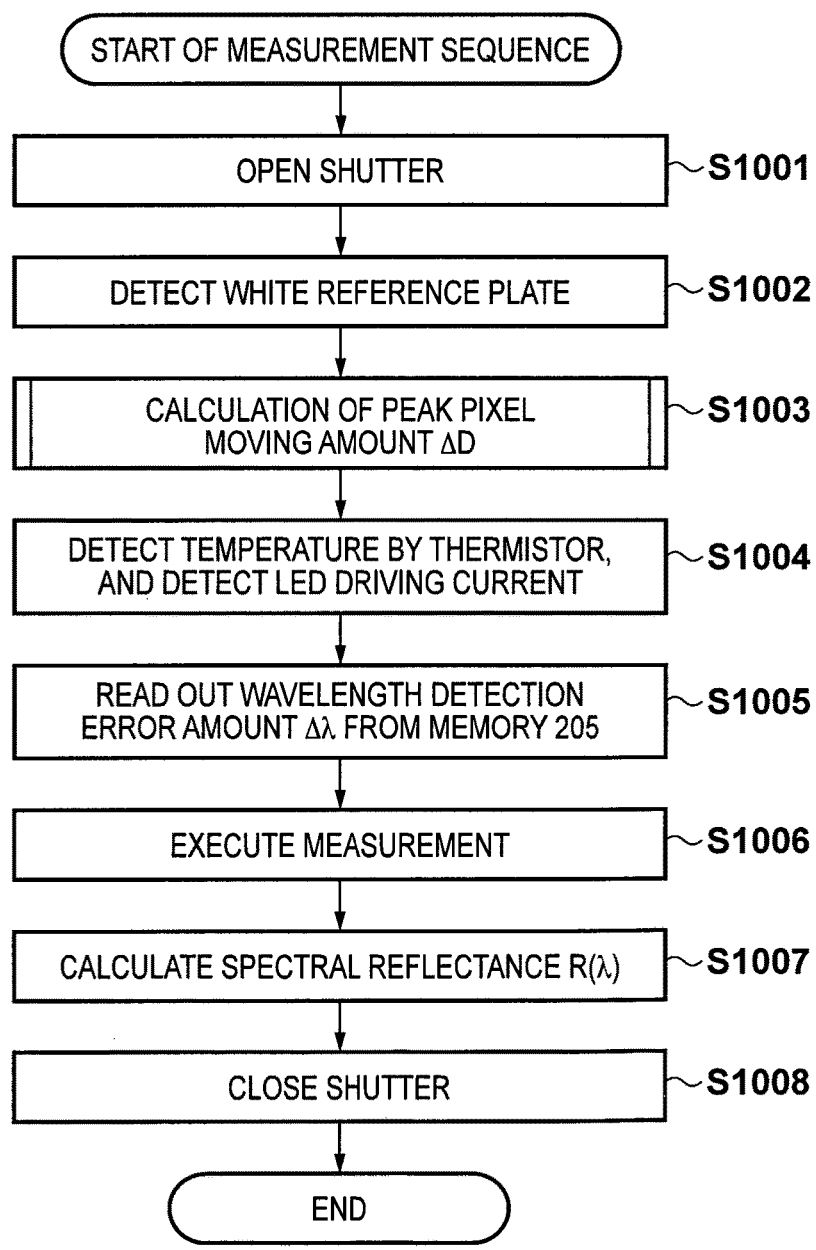
FIG. 10 is a flowchart according to the second embodiment.

FIG. 10 shows an outline of a measurement operation according to the second embodiment. When the measurement sequence starts, an engine control unit 312 instructs a shutter opening/closing mechanism 212 to open a shutter 214 in step S1001. In step S1002, the engine control unit 312 instructs a color sensor control unit 302 to detect a white reference plate 210. In detection of the white reference plate 210, the color sensor control unit 302 controls an LED light source 201 to emit light. Further, the color sensor control unit 302 sets a current value in an LED driver 221 which controls the driving current value of the LED light source 201 so that the output value of a line sensor 203 becomes a predetermined value. Then, the color sensor control unit 302 obtains a quantity W(λ) of light reflected by the white reference plate 210. In step S1003, the engine control unit 312 calculates a peak pixel moving amount ΔD based on the obtained reflected light quantity W(λ). This step is the same as the processing in FIG. 7B described in the first embodiment.

In step S1004, the color sensor control unit 302 calculates an temperature T' of the LED light source by solving equation (4) using an ambient temperature T obtained from a thermistor 220 in a color sensor 200, and a driving current I of the LED light source 201. In step S1005, the color sensor control unit 302 reads out, from the memory 205, a wavelength detection error amount Δλ corresponding to the temperature T' of the LED light source. In step S1006, the engine control unit 312 operates a sheet conveying roller driving motor 311 to convey a measurement target (chart), and detects a measurement value P(λ) of each patch. In step S1007, the color sensor control unit 302 calculates a spectral reflectance R(λ) based on equation (2) using the obtained W(λ), P(λ), and wavelength detection error amount Δλ. In step S1008, the engine control unit 312 instructs the shutter opening/closing mechanism 212 to close the shutter 214. After that, the measurement sequence ends.

By the above-described processing, deviation of the positional relationship between the wavelength and the line sensor can be corrected, and the color measurement accuracy can be maintained against a temperature change, similar to the first embodiment. Since the table is used, correction can be performed by a simpler operation, compared to the first embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-031426, filed Feb. 20, 2013, which is hereby incorporated by reference herein in its entirety.

The invention claimed is:

1. A measurement apparatus comprising:
a light source configured to emit a light which includes different wavelengths;
a diffraction grating configured to disperse a reflected light;
a line sensor configured to receive the reflected light dispersed by the diffraction grating, the line sensor having a plurality of pixels arranged in line;
a temperature detecting device; and
a controller having a processor configured to perform tasks including:
a first obtainment task for obtaining a first receiving result of the dispersed reflected light from a reference member by the line sensor,
a detection task for detecting a peak pixel among the plurality of pixels based on the first receiving result of the dispersed reflected light from the reference member,
a first determination task for determining a first shift amount based on the detected peak pixel,
a second determination task for determining a second shift amount based on a temperature detected by the temperature detecting device,
a third determination task for determining a wavelength detection error amount based on the first shift amount and the second shift amount, a second obtainment task for obtaining a second receiving result of the dispersed reflected light from a measurement target by the line sensor, a correction task for correcting the first receiving result of the dispersed reflected light from the reference member obtained by the first obtainment task based on the wavelength detection error amount, and the second receiving result of the dispersed reflected light from the measurement target obtained by the second obtainment task based on the wavelength detection error amount, and a generation task for generating measuring data for the measurement target based on the corrected first receiving result and the corrected second receiving result.

2. The measurement apparatus according to claim 1, wherein the reference member is a white reference plate.

3. The measurement apparatus according to claim 1, wherein the measuring data is data indicating a spectral reflectance of the measurement target.

4. The measurement apparatus according to claim 1, wherein the temperature is detected at a time when the result of the dispersed reflected light from the reference member is received by the line sensor.

5. The measurement apparatus according to claim 1, wherein the controller, in the correction task, adjusts a correspondence between the plurality of pixels and a wavelength of a dispersed reflected light received by the line sensor based on the first shift amount and the second shift amount, and corrects the first receiving result and the second receiving result based on the correspondence.

6. An image forming apparatus comprising: a printer configured to print a measurement image on a sheet; a measurement device comprising: a light source configured to emit a light which includes different wavelengths; a diffraction grating; a line sensor configured to receive a light dispersed by the diffraction grating, wherein the line sensor has a plurality of pixels; and a temperature detecting device; and a controller having at least one processor, wherein the controller performs tasks including: a print task for controlling the printer to print the measurement image on the sheet, a first obtainment task for controlling the light source to emit the light, and for obtaining a first receiving result of the dispersed reflected light from a reference member, a detection task for detecting a peak pixel among the plurality of pixels based on the first receiving result of the dispersed reflected light from the reference member, a first determination task for determining a first shift amount based on the detected peak pixel, a second determination task for determining a second shift amount based on a temperature detected by the temperature detecting device, a third determination task for determining a wavelength detection error amount based on the first shift amount and the second shift amount, a second obtainment task for controlling the light source to emit the light, and for obtaining a second receiving result of the dispersed reflected light from the measurement image, a correction task for correcting the first receiving result of the dispersed reflected light from the reference member obtained by the first obtainment task based on the wavelength detection error amount, and the second receiving result of the dispersed reflected light from the measurement image obtained by the second obtainment task based on the wavelength detection error amount, and a generation task for generating measuring data for the measurement image based on the corrected first receiving result and the adjusted corrected second receiving result.

7. The apparatus according to claim 6, wherein the peak pixel corresponds to a pixel having a largest value of light-receiving quantity among the plurality of pixels.

8. The apparatus according to claim 6, further comprising a memory configured to store data related to a position of a predetermined pixel in the line sensor,
wherein the controller, in the first determination task, determines the first shift amount based on a difference between a position of the detected peak pixel and the position of the predetermined pixel.

9. The apparatus according to claim 6, wherein
the controller obtains a driving current value of the light source, and
the controller, in the second determination task, determines the second shift amount based on the temperature detected by the temperature detecting device, and the driving current value.

10. The apparatus according to claim 6, wherein the measuring data includes a light quantity of each wavelength of a reflected light from the measurement image.

11. The apparatus according to claim 6, wherein the measuring data includes a spectral reflectance of the measurement image.

12. The apparatus according to claim 6, wherein the reference member is a white reference plate.

13. The apparatus according to claim 6, wherein the controller further performs an emission light adjustment task for adjusting an emission light of the light source before the first obtainment task is performed.

14. The apparatus according to claim 6, wherein the temperature is detected at a time when the result of the dispersed reflected light from the reference member is received by the line sensor.

15. The apparatus according to claim 6, wherein the controller, in the correction task, adjusts a correspondence between the plurality of pixels and a wavelength of a dispersed reflected light received by the line sensor based on the first shift amount and the second shift amount, and corrects the first receiving result and the second receiving result based on the correspondence.

* * * * *